(12) United States Patent  (10) Patent No.: US 6,693,440 B2
Basir et al.  (45) Date of Patent: Feb. 17, 2004

(54) VEHICLE OCCUPANT PROXIMITY SEAT SENSOR

(75) Inventors: Otman Adam Basir, Kitchener (CA); Fakhreddine Karray, Waterloo (CA); Vladimir Filippov, Kitchener (CA)

(73) Assignee: Intelligent Mechantronic Systems, Inc., Waterloo (CA)

( * ) Notice: Subject to any disclaimer, the term of this patent is extended or adjusted under 35 U.S.C. 154(b) by 0 days.

(21) Appl. No.: 09/989,544

(22) Filed: Nov. 20, 2001

(65) Prior Publication Data

US 2002/0180463 A1 Dec. 5, 2002

Related U.S. Application Data

(63) Continuation-in-part of application No. 09/872,873, filed on Jun. 1, 2001, now Pat. No. 6,552,550.
(60) Provisional application No. 60/236,848, filed on Sep. 29, 2000.

(51) Int. Cl.[7] ................................................ G01R 27/26
(52) U.S. Cl. ..................................................... 324/662
(58) Field of Search ................................ 324/661, 662, 324/671; 280/731, 732, 735; 701/45, 46, 47; 340/552, 562, 567; 180/286; 703/10.1–10.8

(56) References Cited

U.S. PATENT DOCUMENTS

| | | | |
|---|---|---|---|
| 3,898,472 A | 8/1975 | Long | |
| 3,943,376 A | 3/1976 | Long | |
| 5,118,134 A | 6/1992 | Mattes et al. | |
| 5,330,226 A | 7/1994 | Gentry et al. | |
| 5,439,249 A | 8/1995 | Steffens, Jr. et al. | |
| 5,691,693 A | 11/1997 | Kithil | |
| 5,722,686 A | 3/1998 | Blackburn et al. | |
| 5,770,997 A | 6/1998 | Kleinberg et al. | |
| 5,802,479 A | 9/1998 | Kithil et al. | |
| 5,871,232 A * | 2/1999 | White | 280/735 |
| 5,948,031 A | 9/1999 | Jinno et al. | |
| 5,954,360 A | 9/1999 | Griggs, III et al. | |
| 6,007,095 A | 12/1999 | Stanley | |
| 6,020,812 A | 2/2000 | Thompson et al. | |
| 6,043,743 A | 3/2000 | Saito et al. | |
| 6,079,738 A | 6/2000 | Lotito et al. | |
| 6,088,640 A | 7/2000 | Breed | |
| 6,094,610 A | 7/2000 | Steffens, Jr. et al. | |
| 6,104,972 A | 8/2000 | Miyamoto et al. | |
| 6,275,146 B1 * | 8/2001 | Kithil et al. | 340/425.5 |
| 6,422,595 B1 * | 7/2002 | Breed et al. | 280/735 |

* cited by examiner

Primary Examiner—N. Le
Assistant Examiner—Amy He
(74) Attorney, Agent, or Firm—Carlson, Gaskey & Olds

(57) ABSTRACT

A vehicle occupant proximity sensor includes a transmitting electrode in a vehicle seat and an array of receiving electrodes mounted in the vehicle seat. The sensor determines the capacitance at each of the receiving electrodes, which varies based upon the proximity of the occupant to each receiving electrode, thus producing an array of proximity information indicating in two dimensions the position of the occupant.

45 Claims, 1 Drawing Sheet

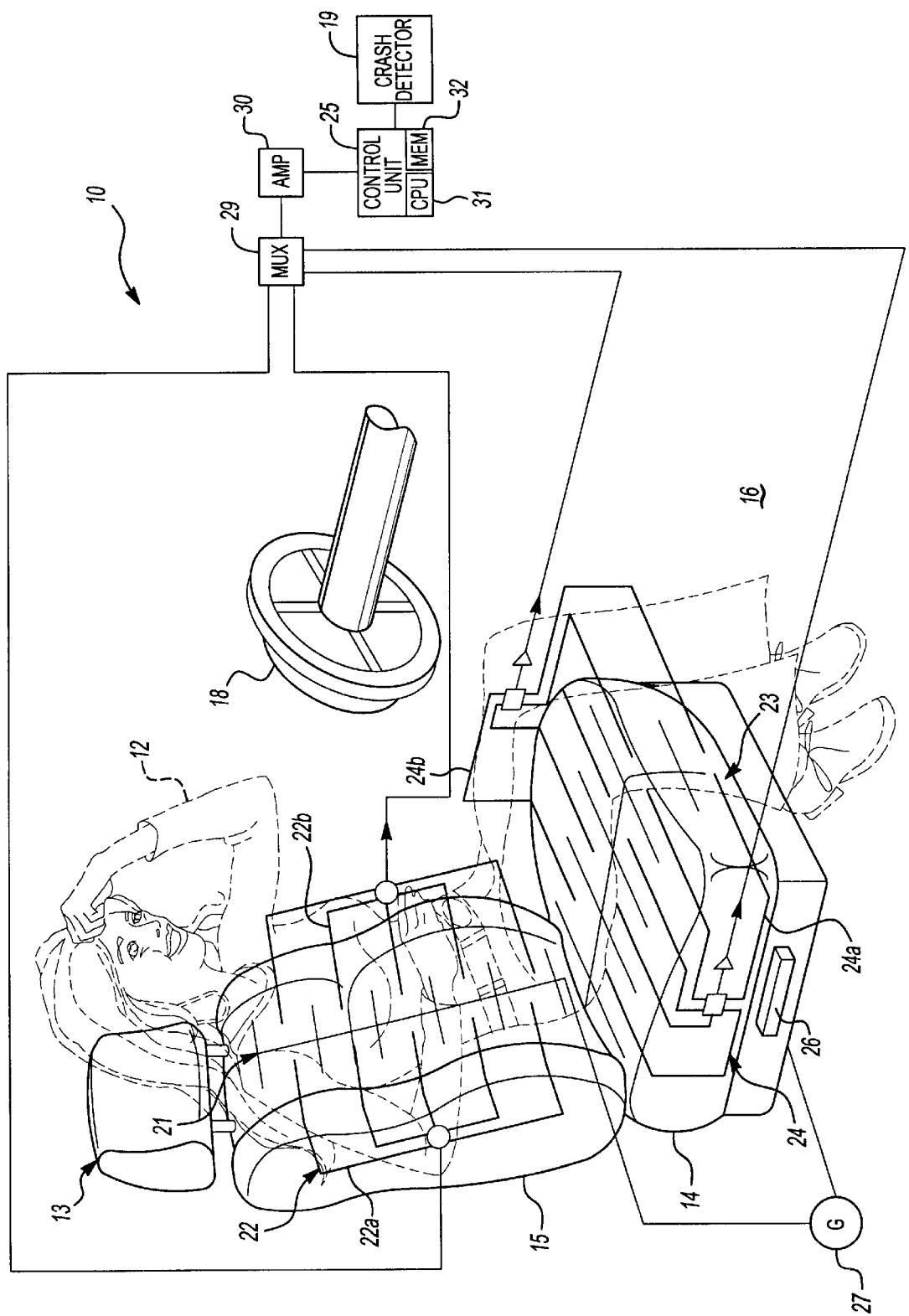

VEHICLE OCCUPANT PROXIMITY SEAT SENSOR

This application is a continuation-in-part of U.S. Ser. No. 09/872,873, filed Jun. 1, 2001, now U.S. Pat. No. 6,552,550, which claims priority to a provisional patent application Serial No. 60/236,848, filed Sep. 29, 2000.

BACKGROUND OF THE INVENTION

The present invention relates to vehicle occupant safety systems, and more particularly, to a vehicle occupant proximity sensor for use with a vehicle occupant safety system.

Vehicle occupant safety systems that are activated in response to a vehicle crash for purpose of mitigating occupant injury are well known in the art. A vehicle may contain automatic safety restraint actuators such as front and side air bags, seat belt pretensioners, and deployable knee bolsters. The occupant protection system may further include a collision/crash sensor for sensing the occurrence of a vehicle crash and for providing an electrical signal indicative of the crash severity.

Several known occupant protection systems include an occupant position sensor that senses the position of the occupant with respect to an associated inflatable protection module. The occupant position sensor for such a system could be an ultrasonic sensor, an infrared sensor, and a capacitive sensor, and/or a weight sensor. A controller, which is connected to the sensors, controls the inflatable protection module in response to the sensed position of the occupant. In response to the sensed occupant position, one or more deployment aspects of the air bag may be adjusted. A protection system with adjustable aspects of deployment is commonly referred to as an "adaptive" protection system. Specifically, if the occupant is positioned in a position such that deploying the air bag will not enhance protection of the occupant, it may be desirable to suppress actuation of the occupant protection module. An occupant who is very near the protection module is referred to as being within an occupant out-of-position zone. Deploying the air bag for an occupant who is within the occupant out-of-position zone may not enhance protection of the occupant.

In any case the determination of occupant's position is an important part of adaptive occupant protection system. There are several types of proximity sensors, such as ultrasonic sensor, a video sensor, a capacitive sensor, and an infrared sensor. Different obstacles such as a map, a book, or a newspaper could occlude signals from ultrasonic and video sensors. A lighter or cigarette could blind an infrared sensor. Existing capacitive sensors rely on the strength of the electric field to determine proximity (i.e. dash mounted capacitive sensor). This makes the sensor susceptible to being fooled if the strength of the electric field is blocked. A system that relies on the strength of the electric field may be inaccurate if a portion of the signal is lost. Furthermore, existing sensors are also complex and expensive.

This invention is based on a simple fact—the physical properties of the human body do not change rapidly. For example, the conductivity of the human body tends to be constant and hence it can be used to measure the distance between the occupant and the corresponding protection module through the use of a capacitive sensor.

SUMMARY OF THE INVENTION

The present invention provides an occupant proximity sensor utilizing an occupant's conductivity to determine proximity by measuring the capacitance from a plurality of sensors mounted in the vehicle seat.

A transmitting electrode and an array of receiving electrodes are mounted in the occupant's seat. A control unit serially switches these receiving electrodes to create a profile of the produced electric field. Desired precision is achieved by counting the proximity for each element in the array. The resulting data indicates in two dimensions the accurate position of the occupant in the passenger compartment. The control unit utilizes an excitation method and a synchronous detection method to measure capacitance. It uses micro power low frequency signal that is safe for humans.

BRIEF DESCRIPTION OF THE DRAWINGS

Other advantages of the present invention will be readily appreciated as the same becomes better understood by reference to the following detailed description when considered in connection with the accompanying drawings wherein:

The FIGURE illustrates the vehicle occupant proximity sensor installed in a vehicle passenger compartment with an occupant safety system.

DETAILED DESCRIPTION OF A PREFERRED EMBODIMENT

The FIGURE illustrates a vehicle occupant proximity sensor system 10 for determining the position of an occupant 12 in a vehicle seat 13. The seat generally comprises a seat base 14 and seat back 15. The vehicle seat 13 is installed in a vehicle passenger compartment 16 having an occupant safety system, including an automatic safety restraint, such as an airbag 18. Although a steering wheel mounted airbag 18 is illustrated as an example, it should also be understood that the present invention is also useful for side airbags, seatbelt pre-tensioners, deployable knee bolsters, and any other automatic safety restraint actuators. Crash detector 19, such as a crash sensor of any known type, is used to determine the occurrence of a vehicle crash and to determine the crash severity.

The vehicle occupant proximity sensor system 10 comprises a transmitting electrode array 21 and a receiving electrode array 22 both mounted in the seat back 15. The receiving electrode array 22 comprises lateral halves 22a and 22b, each having a plurality of receiving electrodes. Similarly, a transmitting electrode array 23 and a receiving electrode array 24 are mounted in the seat base 14, receiving electrode array 24 comprising lateral halves 24a and 24b, each having a plurality of receiving electrodes. In the seat and the base, the transmitting electrode array 21, 23 generates an electromagnetic signal that is received by the corresponding receiving electrode array 22, 24. A control unit 25 receives electrical signals from each receiving electrode array 22, 24 based upon the electromagnetic signal received by the electrode array 22, 24 (connections to and from control unit 25 are omitted for clarity). The control unit 25 also receives a signal from seat track position sensor 26 indicating the position of the vehicle seat 13 on a vehicle track (not shown) in the passenger compartment 16.

Each transmitting electrode 21, 23 may comprise a coil of wire or a copper sheet and can be made from any conductive material, but preferably comprises copper wires approximately one inch apart. Generally, it is preferred to cover a large area of the base 14 and back 15 of the seat 13 with the transmitting electrodes 21, 23 and to wrap the base transmitting electrode 21 around the front of the base 14 of the seat 13. It should be insured that neither transmitting electrode 21, 23 is shorted to ground via the frame of the vehicle.

A frequency generator 27 generates a 10 KHz signal to the transmitting electrodes 21, 23 which is then transmitted as an electromagnetic signal in the passenger compartment 16.

The receiving electrodes each comprise a small wire positioned between each pair of wires from the transmitting electrodes 21, 23. The receiving electrode arrays 22*a–b*, 24 are connected to the control unit 25 via a multiplexer 29 and amplifier 30. Again, it must be insured that none of the receiving electrodes 22*a–j*, 24*a–j* are shorted to ground via the frame. The multiplexer 29 enables the control unit 25 to sequentially read values from each of the receiving electrodes in arrays 22, 24 to determine the position of the occupant 12.

The control unit 25 generally comprises a CPU 31 having memory 32. The CPU 31 is suitably programmed to perform the functions described herein and any person of ordinary skill in the art could program the CPU 31 accordingly and supply any additional hardware not shown but needed to implement the present invention based upon the description herein.

In operation, the control unit 25 controls generator 27 to generate a 10 KHz signal to the transmitting electrodes 21, 23. The transmitting electrodes 21, 23 transmit a 10 KHz signal as an electromagnetic wave inside the vehicle passenger compartment 16. The electromagnetic signal passes through occupant 12 and is received by the respective receiving electrode arrays 22, 24. The signal received by each receiving electrode in array 22, 24 is based upon the capacity around it, which in turn will vary depending upon the proximity of the occupant 12 to each receiving electrode in array 22, 24.

As shown, each receiving electrode array 22, 24 is divided into lateral halves 22*a* and 22*b*, and 24*a* and 24*b*. Thus, the control unit 25 can determine the position of the occupant 12 in two dimensions in the vehicle passenger compartment 16, namely, along the longitudinal and lateral axes of the vehicle. The lateral position information can be used to determine whether to activate side air bags or the force for deployment of the side air bags, or can also be used for activation of the steering wheel mounted air bag 18. The size and resolution of the receiving electrode arrays 22, 24 may vary for different applications and different vehicles.

The control unit 25 controls multiplexer 29 to sequentially read each of the receiving electrodes in arrays 22, 24. Although performed sequentially, it is performed sufficiently quickly relative to normal motion of a vehicle occupant 12 to provide what is effectively an instantaneous two-dimensional snapshot of the position of the occupant 12 in the passenger compartment 16. Since the vehicle occupant proximity sensor 10 of the present invention provides an array of proximity values, this array of information can be processed as an image.

It should be noted that in determining the position of the occupant 12, the control unit 25 compares the values from each receiving electrode in arrays 22, 24 to each other, in addition to evaluating their absolute values. In comparing values from the electrodes to each other, the information from the receiving electrode arrays 22, 24 is preferably processed as images, using known image processing techniques. Further, the control unit 25 monitors the information from the receiving electrode arrays 22, 24 over time. For example, the position of the occupant 12 cannot change instantaneously; it must follow a path from one point to another. The control unit 25 may additionally take information from the vehicle seat track sensor 26, which indicates the position of the vehicle seat 13 on a vehicle seat track.

All of this information is utilized by control unit 25 to determine whether to deploy the airbag 18 (or other safety restraint device) based upon a crash detected by crash detector 19 and the severity of a crash. For example, if the control unit 25 determines, based upon information from receiving electrode arrays 22, 24 that the occupant 12 is too close to airbag 18, the control unit 25 may determine not to activate airbag 18 in the event of a crash, or the control unit 25 may determine that airbag 18 should be deployed with less force. On the other hand, if occupant 12 control unit 25 determines based upon information from receiving electrode arrays 22, 24 that occupant is at a distance from airbag 18 in excess of a predetermined threshold, the control unit 25 will cause airbag 18 to deploy, or will cause airbag 18 to deploy with higher force, depending upon the severity of the crash as determined by crash detector 19.

Additionally, information from seat track sensor 26 may be utilized with the proximity information to determine whether and/or how airbag 18 should be deployed. For example, if seat track sensor 26 indicates that the vehicle seat 13 is adjusted forward in the vehicle passenger compartment 16, and the receiving electrode arrays 22, 24 indicate that the occupant 12 is also forward, the control unit 25 may determine not to deploy airbag 18 in the event of a crash. On the other hand, if the seat track position sensor indicates that the vehicle seat 13 is too far forward, the control unit 25 may decide not to deploy airbag 18, even though the receiving electrode arrays 22, 24 indicate that the occupant 12 is sufficiently rearward for deployment. Further, the control unit 25 may determine that if the occupant 12 is sufficiently rearward, the airbag 18 may be deployed in the event of a crash even though the vehicle seat track position sensor 26 indicates that the vehicle seat 13 is too far forward. Generally, those of ordinary skill in the art will program control unit 25 utilizing the above and many additional rules for whether to fire airbag 18, and for a multiple stage airbag 18, how much force airbag 18 should be deployed. The present invention provides additional information to the control unit 25, such that those of ordinary skill in the art could take in this additional information to properly determine whether and with how much force to activate airbag 18.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method for determining whether to activate a vehicle occupant safety system for an occupant of a seat including the steps of:
   a. Receiving an electromagnetic signal at a plurality of laterally-spaced points on a seating surface of the vehicle seat;
   b. Determining a position of the occupant relative to the seat based upon said step a; and
   c. Determining whether to activate the vehicle occupant safety system based upon said step b.

2. The method of claim 1 wherein said seat comprises a base and a back, said step a including the step of receiving the electromagnetic signal at the plurality of points in the base of the seat.

3. The method of claim 2 further includes the step of transmitting the electromagnetic signal from the base of the seat.

4. The method of claim 2 wherein said step a further includes the step of receiving the electromagnetic signal at the plurality of points in the back of the seat.

5. The method of claim 4 further includes the step of transmitting the electromagnetic signal from the back of the seat.

6. The method of claim 5 further including the step of:
d. determining the capacitance at a plurality of points adjacent the seat based upon said step a.; and
e. performing said step b based upon said step d.

7. The method of claim 1 wherein said step a. further includes the step of transmitting the electromagnetic signal from the seat.

8. The method of claim 1 wherein said step a. further includes the step of measuring capacitance based upon the electromagnetic signal received at the plurality of points.

9. The method of claim 8 wherein said step a. further includes the step of measuring capacitance at an array of the plurality of points.

10. The method of claim 9 wherein said step a. further includes the step of comparing the capacitance measured at each of the plurality of points with each other.

11. The method of claim 10 wherein said step a. further includes the step of:
d) monitoring a change in capacitance over time at the plurality of points; and
e) in said step c), determining whether to activate the vehicle occupant safety system based upon said step d).

12. The method of claim 1 wherein the plurality of points are arranged in at least two dimensions on the seating surface of the vehicle seat, wherein the seating surface is a seat base or a seat back.

13. The method of claim 1 wherein a first plurality of the plurality of points is laterally-spaced from a second plurality of the plurality of points.

14. The method of claim 1 further including the step of:
d. evaluating a position of the vehicle seat relative to the occupant safety system prior to said step c.; and
wherein the step of determining in said step c. is also based upon said step d.

15. The method of claim 14 wherein the position of the vehicle seat is determined from a seat track sensor.

16. A vehicle passenger compartment proximity sensing system comprising:
A capacitive sensor array in a seat in a vehicle passenger compartment measuring capacitance at a plurality of points in the vehicle passenger compartment; and
A controller determining a position of an occupant relative to the seat based upon a comparison of the capacitance measured at the plurality of points with each other.

17. The vehicle passenger compartment proximity sensing system of claim further comprising:
A first electrode generating an electromagnetic signal;
Said capacitive sensor array comprising a plurality of second electrodes mounted in the seat receiving the electromagnetic signal; and
the controller determining capacitance at each of the second electrodes to determine the position of the occupant relative to the seat.

18. The vehicle passenger compartment proximity sensing system of claim 17 wherein the first electrode is mounted in the seat in the vehicle passenger compartment.

19. The system of claim 16 wherein the controller evaluates absolute values of the capacitance measured at each of the plurality of points to determine the position of the occupant.

20. A method for activating a vehicle occupant safety system including the steps of:
receiving an electromagnetic signal at each of a plurality of points in a seat in a vehicle passenger compartment having an occupant safety system;
measuring capacitance based upon the electromagnetic signal received at the plurality of points;
comparing the capacitance measured at each of the plurality of points with each other; and
determining a position of an occupant relative to the seat based upon said step c).

21. The method of claim 20 further including the step of:
Determining whether to activate the vehicle occupant safety system based upon said step d).

22. The method of claim 21 further including the step of transmitting the electromagnetic signal from the seat.

23. A vehicle passenger compartment proximity sensor system comprising:
a capacitive sensor array in a seat in a vehicle passenger compartment measuring capacitance at a plurality of laterally-spaced points in the vehicle passenger compartment, the capacitive sensor array including a receiving electrode array, the system further including a transmitting electrode array; and
a controller determining a position of an occupant relative to the seat based upon the capacitance measured at the plurality of points.

24. The system of claim 23 wherein the receiving electrode array and the transmitting electrode array are mounted in a seat back of the vehicle seat.

25. The system of claim 24 wherein each of the receiving electrode array and the transmitting electrode array comprises lateral halves, each lateral half of each array including a plurality of electrodes.

26. A vehicle passenger compartment proximity sensor system comprising:
a capacitive sensor array in a seat in a vehicle passenger compartment measuring capacitance at a plurality of points in the vehicle passenger compartment, the capacitive sensor array including a receiving electrode array, the system further including a transmitting electrode array, wherein each electrode in the receiving electrode array is positioned between two of the electrodes of the transmitting electrode array; and
a controller determining a position of an occupant relative to the seat based upon the capacitance measured at the plurality of points.

27. The method of claim 1 further including the steps of:
d. Simultaneously transmitting the electromagnetic signal from a plurality of transmission points in the vehicle seat.

28. The method of claim 27 wherein the plurality of points at which the electromagnetic signal is received in said step a. is a plurality of reception points, and wherein the plurality of reception points are alternated with the plurality of transmission points.

29. The method of claim 28 wherein one of the plurality of transmission points and the plurality of reception points is laterally spaced relative to the other.

30. A The method of claim 29 wherein the one of the plurality of transmission points and the plurality of reception points is laterally spaced on both lateral sides of the other.

31. A vehicle passenger compartment proximity sensing system comprising:
a plurality of capacitive sensors in a seat in a vehicle passenger compartment measuring capacitance at a plurality of points on a seating surface of the seat, the capacitive sensors including a plurality of electrodes, at least one of which is laterally spaced from an other one of the plurality of electrodes; and a controller determining a position of an occupant relative to the seat based upon the capacitance measured at the plurality of points.

32. The system of claim 31 wherein the plurality of electrodes includes a plurality of receiving electrodes in the seat.

33. The system of claim 32 wherein the plurality of electrodes includes a plurality of transmitting electrodes in the seat.

34. The system of claim 33 wherein the plurality of receiving electrodes is laterally spaced from the plurality of transmitting electrodes.

35. The system of claim 32 wherein the plurality of receiving electrodes includes a first plurality of receiving electrodes laterally spaced from a second plurality of receiving electrodes.

36. The system of 31 wherein the seating surface is an upper surface of a seat base and a front surface of a seat back.

37. The system of claim 31 further including a seat track sensor determining a position of the seat, the controller determining the position of the occupant relative to a vehicle occupant safety system based the position of the seat and based upon the position of the occupant relative to the seat.

38. The system of claim 31 wherein the capacitive sensors include a first plurality of capacitive sensors in the seat laterally spaced from a second plurality of capacitive sensors in the seat.

39. A method for determining whether to activate a vehicle occupant safety system for an occupant of a seat including the steps of:

a. receiving an electromagnetic signal at a plurality of laterally-spaced points in the vehicle seat;

b. determining a position of the occupant relative to the seat based upon said step a;

c. determining a position of the seat relative to the vehicle occupant safety system;

d. determining a position of the occupant relative to the occupant safety system based upon said steps b. and c.; and e. determining whether to activate the occupant safety system based upon said step d.

40. The method of claim 39 wherein the plurality of points includes a first plurality of points laterally spaced from a second plurality of points.

41. The method of claim 39 wherein the plurality of points is a plurality of reception points and wherein said step a. further includes the step of transmitting the electromagnetic signal from a plurality of transmission points interspersed among the plurality of reception points.

42. The method of claim 41 wherein the plurality of transmission points are laterally and longitudinally interspersed among the plurality of reception points.

43. A vehicle passenger compartment proximity sensor system comprising:

a plurality of capacitive sensors in a seat in a vehicle passenger compartment measuring capacitance at a plurality of laterally-spaced points in the vehicle passenger compartment;

a seat position sensor determining a position of the seat relative to the vehicle passenger compartment; and a controller determining a position of an occupant relative to the seat based upon the capacitance measured at the plurality of points and determining the position of the occupant relative to the vehicle passenger compartment based upon the position of the occupant relative to the seat and based upon the position of the seat relative to the vehicle passenger compartment.

44. The system of claim 43 wherein at least one of the plurality of capacitive sensors is laterally spaced from an other one of the plurality of capacitive sensors.

45. The system of claim 43 wherein the plurality of capacitive sensors measure capacitance of the plurality of points on a seating surface of the seat.

* * * * *

UNITED STATES PATENT AND TRADEMARK OFFICE
CERTIFICATE OF CORRECTION

PATENT NO. : 6,693,440 B2
DATED : February 17, 2004
INVENTOR(S) : Basir et al.

It is certified that error appears in the above-identified patent and that said Letters Patent is hereby corrected as shown below:

Column 5,
Line 54, please insert -- 16 -- after "claim" and before "further".

Signed and Sealed this

Fourth Day of May, 2004

JON W. DUDAS
*Acting Director of the United States Patent and Trademark Office*